United States Patent
Vivolo et al.

(10) Patent No.: US 8,640,261 B2
(45) Date of Patent: Jan. 28, 2014

(54) METHOD AND CLIENT AGENT FOR MONITORING THE USE OF PROTECTED CONTENT

(75) Inventors: Olivier Vivolo, Rennes (FR); Claudia Becker, Rennes (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 13/504,416

(22) PCT Filed: Oct. 21, 2010

(86) PCT No.: PCT/FR2010/052244
§ 371 (c)(1),
(2), (4) Date: Apr. 26, 2012

(87) PCT Pub. No.: WO2011/051595
PCT Pub. Date: May 5, 2011

(65) Prior Publication Data
US 2012/0216300 A1    Aug. 23, 2012

(30) Foreign Application Priority Data
Oct. 26, 2009    (FR) ..................................... 09 57498

(51) Int. Cl.
G06F 7/04        (2006.01)
G06F 17/30      (2006.01)
G06F 15/173    (2006.01)

(52) U.S. Cl.
USPC ................................ 726/30; 709/225; 726/26

(58) Field of Classification Search
None
See application file for complete search history.

(56) References Cited

U.S. PATENT DOCUMENTS 6,038,367 A    3/2000  Abecassis
(Continued)

FOREIGN PATENT DOCUMENTS

| DE | 10156877 A1 | 5/2003 |
|----|----|----|
| WO | 2007074431 A2 | 7/2007 |
| WO | 2008083163 A2 | 7/2008 |
| WO | WO 2008083163 A2 * | 7/2008 |

OTHER PUBLICATIONS

International Search Report and Written Opinion dated Mar. 18, 2011 for corresponding International Application No. PCT/FR2010/052244, filed Oct. 21, 2010.

(Continued)

*Primary Examiner* — Andrew L Nalven
*Assistant Examiner* — Quy Pham
(74) *Attorney, Agent, or Firm* — David D. Brush; Westman, Champlin & Koehler, P.A.

(57) ABSTRACT

A method and apparatus are provided for controlling use of content protected with a digital rights management license which contains conditions for the use. When a request to use the content is received by a client agent controlling the use of the content, the conditions of use are checked. Within this check, a determination is made that the use of the content is conditional upon an obligation to perform a parental control operation on the content. A request for authorization to use the content is then transmitted from the controlling client agent to a parental control management module. After a parental control operation has been performed on the content by the parental control management module, the agent receives a result of the parental control operation. If the result is negative, a denial of use of the content is notified in response to the request to use the content.

12 Claims, 4 Drawing Sheets

(56) References Cited

U.S. PATENT DOCUMENTS

| | | |
|---|---|---|
| 7,103,663 B2 * | 9/2006 | Inoue et al. .................. 709/225 |
| 8,180,834 B2 * | 5/2012 | Kay et al. ..................... 709/206 |
| 8,355,989 B2 * | 1/2013 | Yoon et al. ..................... 705/51 |
| 2002/0010679 A1 | 1/2002 | Felsher |
| 2006/0129490 A1 | 6/2006 | Collar et al. |
| 2008/0082448 A1 | 4/2008 | Meijer et al. |

OTHER PUBLICATIONS

French Search Report dated Jun. 11, 2010 for corresponding French Application No. FR 0957498, filed Oct. 26, 2009.

English Translation of the International Preliminary Report on Patentability and Written Opinion dated Jun. 12, 2012 for corresponding International Application No. PCT/FR2010/052244, filed Oct. 21, 2010.

* cited by examiner

METHOD AND CLIENT AGENT FOR MONITORING THE USE OF PROTECTED CONTENT

CROSS-REFERENCE TO RELATED APPLICATIONS

This Application is a Section 371 National Stage Application of International Application No. PCT/FR2010/052244, filed Oct. 21, 2010, which is incorporated by reference in its entirety and published as WO 2011/051595 on May 5, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to a method and a client agent for controlling the use of a protected content associated with a digital rights management license.

BACKGROUND OF THE DISCLOSURE

A digital rights management (DRM) license, associated with content protected by encryption, is a data structure generally containing:
  an identifier for establishing the link between the license and the content to which it relates;
  a cryptographic key enabling the content to be decrypted;
  one or more conditions of use of the content.

The conditions of use of the content may comprise a maximum number of uses of the content, a time window during which the content can be used, an authorized number of transfers of the content between different terminals, etc. In order to use content that is protected and associated with a DRM license using a terminal, a DRM client agent located in the terminal first checks whether the conditions of use are satisfied. If such is the case, the DRM client agent generally supplies the cryptographic key present in the license to a decryption module which then decrypts the content.

Moreover, there are parental control management applications. A parental control management application makes it possible to automatically restrict access to certain contents, in order to protect certain users from inappropriate contents. There are different types of parental control management applications. An application according to a first type is configured to apply the legislation in terms of parental control. An application according to a second type is managed by the parents in order to allow them to automatically restrict access to certain contents for their children. In this case, the application is parameterized by the parents who define parental criteria applicable to their children. The contents are characterized by information relating to their nature which may comprise, for example, levels in terms of violence, nudity and sex. When a user requests access to a given content, the parental control management application can provide the user with information concerning the nature of the content, in other words, concerning the levels of the content in terms of violence, nudity and sex. Then, if the parental criteria require the user to be of a certain age to access this content, the application can ask him or her to prove that he or she is old enough by prompting him or her either to input a confidential parental code, or to identify him/herself with a user account considered to be old enough, or to supply bank card details, or to provide identification data, etc. The parental control management application then determines whether the use of the content by the user concerned is authorized or not, depending on the proof provided.

The DRM systems make it possible to control the use of contents according to digital rights attached to these contents, whereas the parental control management applications make it possible to control the use of content on the basis of parental criteria. These two systems are quite distinct and not compatible. In particular, it is currently not possible to establish parental control simply on content protected and managed by a DRM license.

The document WO 2008/083163 describes a system (VPE—Viewing Policy Engine) for controlling access to encrypted contents stored on a media disk connected to a reader. When a user wants to read content stored on the media disk, the control system checks a set of conditions before authorizing or denying the reading of the content. These conditions may comprise a condition relating to the current date, said current date having to be later than a release date, a valid subscription condition, a condition relating to the number of times the content has been read, this number having to be less than a maximum number. Furthermore, if the content is prohibited to children whose age is below a given age limit, provision is made to request the input of a password. Thus, the document WO 2008/083163 provides, for access to encrypted content, for various access criteria (release date, subscription, etc.) to be checked and for a parental control operation to be performed. In the final analysis, this document proposes that one and the same control system simultaneously checks the content access criteria and performs a parental control operation with the user wanting to access the content. This system does, however, require the user to use the parental control module specific to the control system, which lacks flexibility.

SUMMARY

An aspect of the present disclosure relates to a method for obtaining and controlling the use of content by a terminal, said terminal comprising a client agent for controlling the use of the content, in which
  in response to a request transmitted to a server, the terminal receives said content in encrypted form together with an associated digital rights management license, said license containing conditions for the use of the content,
  in case of a command to read said content, the controlling client agent checks the conditions of use of the content, present in the license,
  characterized in that
  the terminal transmits to the server a parental control management module identifier,
  the received license, associated with the content, contains
    a condition making the use of the content conditional upon the prior performance of a parental control operation and
    the identifier of said parental control management module transmitted,
  when checking the conditions of use of the content, the controlling client agent determines that the use of the content is conditional upon an obligation to perform a parental control operation on the content and, using the identifier of the parental control management module extracted from the license, it transmits a request for authorization to use the content to the parental control management module, the parental control management module performs a parental control operation on said content and transmits a result of the parental control to the controlling agent in order to authorize or deny the reading of the content depending on whether the result is positive or negative.

According to an embodiment of the invention, one of the conditions of use of the content present in the license associated with the content is a condition making the use of the content conditional upon the performance of a parental control operation. Thus, the checking of the conditions of use of content initiates the parental control operation. Furthermore, the terminal transmits to the server the identifier of a parental control module and receives in response the content and a license generated specifically for the terminal and containing the parental control module identifier previously transmitted. This allows for a more flexible management of the use of the parental control modules. The terminal can easily change parental control module. All it has to do is transmit an identifier of the selected new parental control module to the server for said server to generate, following a subsequent content request, an associated license containing the identifier of this new parental control module.

In a first embodiment, the parental control management module identifier is present in the request transmitted by the terminal to the server to obtain the content.

In a second embodiment, the parental control management module identifier is transmitted by the terminal to the server in a preliminary configuration step and is stored by the server in a database in order to respond to subsequent requests from the terminal to receive contents.

Advantageously, a step is provided for authenticating the parental control management module by the client agent controlling the use of the content.

An embodiment of the invention also relates to a communication terminal comprising means of communication with a server arranged to transmit to the server a request to obtain content and to receive, in response, the content in encrypted form together with an associated digital rights management license containing conditions for the use of the content, means for reading the content and an agent for controlling the use of the content, arranged, in the case of a command to read said content by the reading means, to check the conditions of use of the content, present in the license, characterized in that the communication means are arranged to transmit to the server a parental control management module identifier, the received license, associated with the content, containing a condition making the use of the content conditional upon the prior performance of a parental control operation and the identifier of said parental control management module transmitted by the terminal to the server, the controlling client agent is arranged to determine that the use of the content is conditional upon an obligation to perform a parental control operation on the content, and transmit a request for authorization to use the content to the parental control management module, identified by the identifier of the parental control management module extracted from the license, authorize or deny the reading of the content by the reading means depending on whether the result of the parental control is positive or negative.

BRIEF DESCRIPTION OF THE DRAWINGS

The disclosure will be better understood from the following description of a number of exemplary embodiments of the method for controlling the use of a protected content associated with a digital rights management license and of the controlling client agent, with reference to the appended drawings in which.

DETAILED DESCRIPTION OF ILLUSTRATIVE EMBODIMENTS

Figure 1:
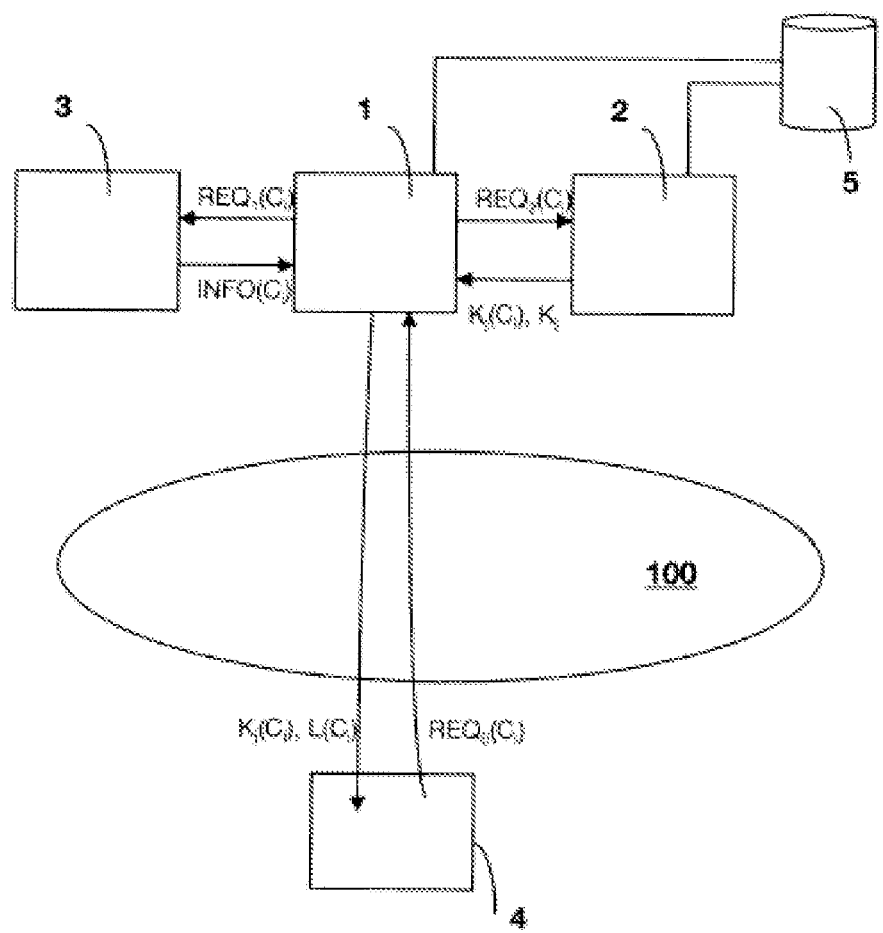
FIG. 1 represents a schematic view of content transmission system.

FIG. 1 shows content transmission system comprising a server 1 for downloading contents and associated digital rights management licenses, an encryption device 2 and a parental control management server 3.

The server 1 for downloading contents $C_i$ associated digital rights management licenses $L(C_i)$, or DRM licenses, is suitable for transmitting contents protected by encryption and DRM licenses associated with these contents to user terminals, through a communication network 100, in this case the Internet. It is linked to a database 5 of contents $C_i$ in clear (with i>0).

The encryption device 2, also linked to the content database 5, is intended to receive requests to encrypt contents $C_i$ the download server 1. Each request contains here an identifier of the content requested enabling this content to be identified in the database 5. As a variant, it would be possible to envisage the download server 1 transmitting the content in clear with the encryption request. In this case, it would not be necessary to link the encryption device 2 to the database 5.

On receipt of a request to encrypt a given content $C_i$, the encryption device 2 is arranged to generate a cryptographic key $K_j$ (with j>0), encrypt the content $C_i$ with this key $K_j$ then transmit to the download server 1 the content $C_i$ encrypted form, denoted $K_j(C_i)$, and the key $K_j$.

The parental control management server 3 is arranged to provide the download server 1 with information concerning the nature of the contents. This information may comprise the minimum age required to use the content such as, for example, content prohibited to under 18 years and/or levels, or degrees, characterizing the content in relation to specific parental criteria, for example, in the particular example described here, criteria of violence, nudity and sex. A set of levels is defined for each parental criterion. In the case in point, the criterion of violence (respectively of nudity and of sex) is associated with five levels of violence (respectively of nudity and of sex). The first level corresponds to a null level of violence (respectively of nudity and of sex), the second level to a low level of violence (respectively of nudity and of sex), the third level to an average level of violence (respectively of nudity and of sex), the fourth level to a high level of violence (respectively of nudity and of sex) and the fifth level to a very high level of violence (respectively of nudity and of sex).

Figure 3:
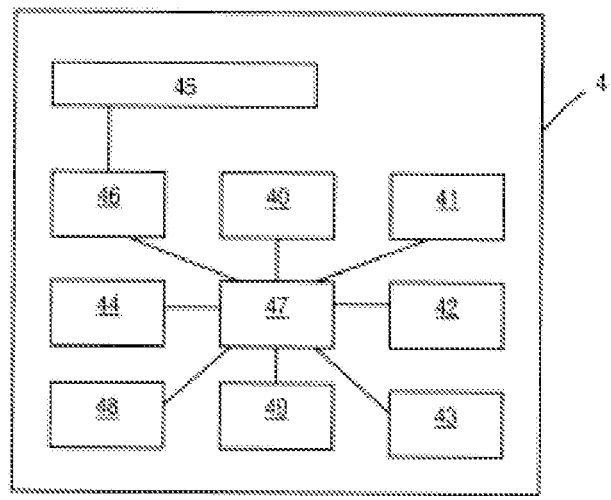
FIG. 3 represents a functional block diagram of a user terminal of FIG. 1.

FIG. 1 also shows a user terminal 4. This terminal 4 is capable of communicating with the download server 1 through the Internet 100. With reference to FIG. 3, the terminal 4 comprises a DRM client agent 40, a parental control management module 41, a decryption module 42, a module 43 for reading contents, a user interface 44, an interface 45 for connection to the Internet 100 and an Internet browser 46. The terminal 4 also comprises a memory 48 intended to store contents and their associated DRM licenses and a memory 49 intended to store user information. A central control unit 47, to which all the elements of the terminal are connected, is intended to control the operation of the terminal 4.

Figure 4:
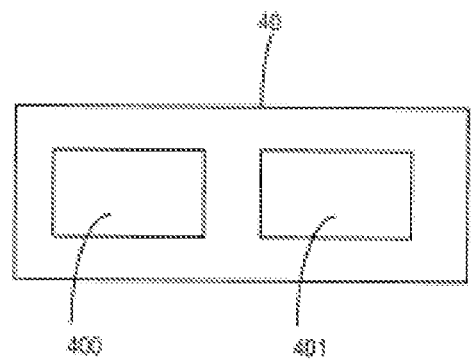
FIG. 4 represents a functional block diagram of a DRM client agent of the terminal of FIG. 3.

With reference to FIG. 4, the DRM client agent 40 comprises a communication module 400 and a module 401 for checking conditions of a DRM license. Furthermore, the DRM client agent 40 has access to the memory 48 of the terminal 4, in which the contents and their associated DRM licenses are stored.

The communication module 400 is suitable for
  receiving a request to authorize use of content from the reading module 43 of the terminal 4,
  in the case where the use of the content is conditional upon the performance of a parental control operation, transmitting a request for authorization to use the content to the parental control management module 41 identified by its unique identifier, for example a GUID (Global Unique Identifier), extracted from the associated DRM license, this request containing information relating to the nature of the content, also extracted from the license,
  after a parental control operation has been performed on the content by the parental control management module 41, receiving, from the module 41, a response containing the result of the parental control,
  transmitting to the reading module 43 a message authorizing use of the content, here only in the case where the result of the parental control is positive, and the license conditions relating to the digital rights on the content are satisfied.

In the case where the result of the parental control is negative or in the case where the license conditions relating to the digital rights on the content are not satisfied, the communication module 400 of the DRM client agent 40 is designed not to respond to the request for authorization to use the content transmitted by the reading module 43, in order to notify its denial of use of the content to the reading module 43. In this case, the reading module 43 is designed to interpret this absence of response, on expiry of a predefined duration, as a denial of use of the content. As a variant, the communication module 400 could be designed to transmit a message denying use of the content to notify this denial to the reading module 43.

The checking module 401 is designed to check the conditions of use of content present in the DRM license associated with this content, on receipt of a request to authorize use of this content from the reading module 43 of the terminal 4. The module 401 is designed to check the license conditions relating to the digital rights on the content in a known manner. Furthermore, in the case where the DRM license of the content contains a parental control condition, the module 401 is capable of determining that the use of this content is conditional upon an obligation to perform a parental control operation on the content and, in this case, initiate a dialog between the DRM agent 40 and the parental control management module 41 to command the performance of a parental control operation and receive the result of this operation.

Figure 2A:
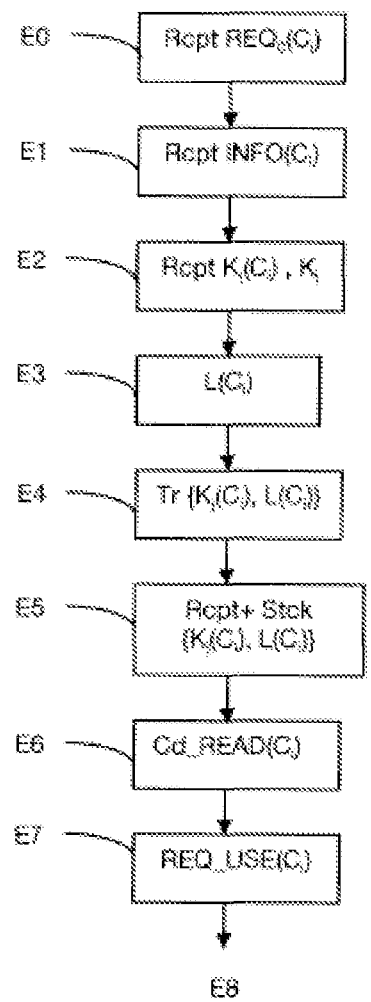
FIGS. 2A and 2B represent flow diagrams of the steps of the method according to a particular exemplary embodiment of the invention.
Figure 2B:
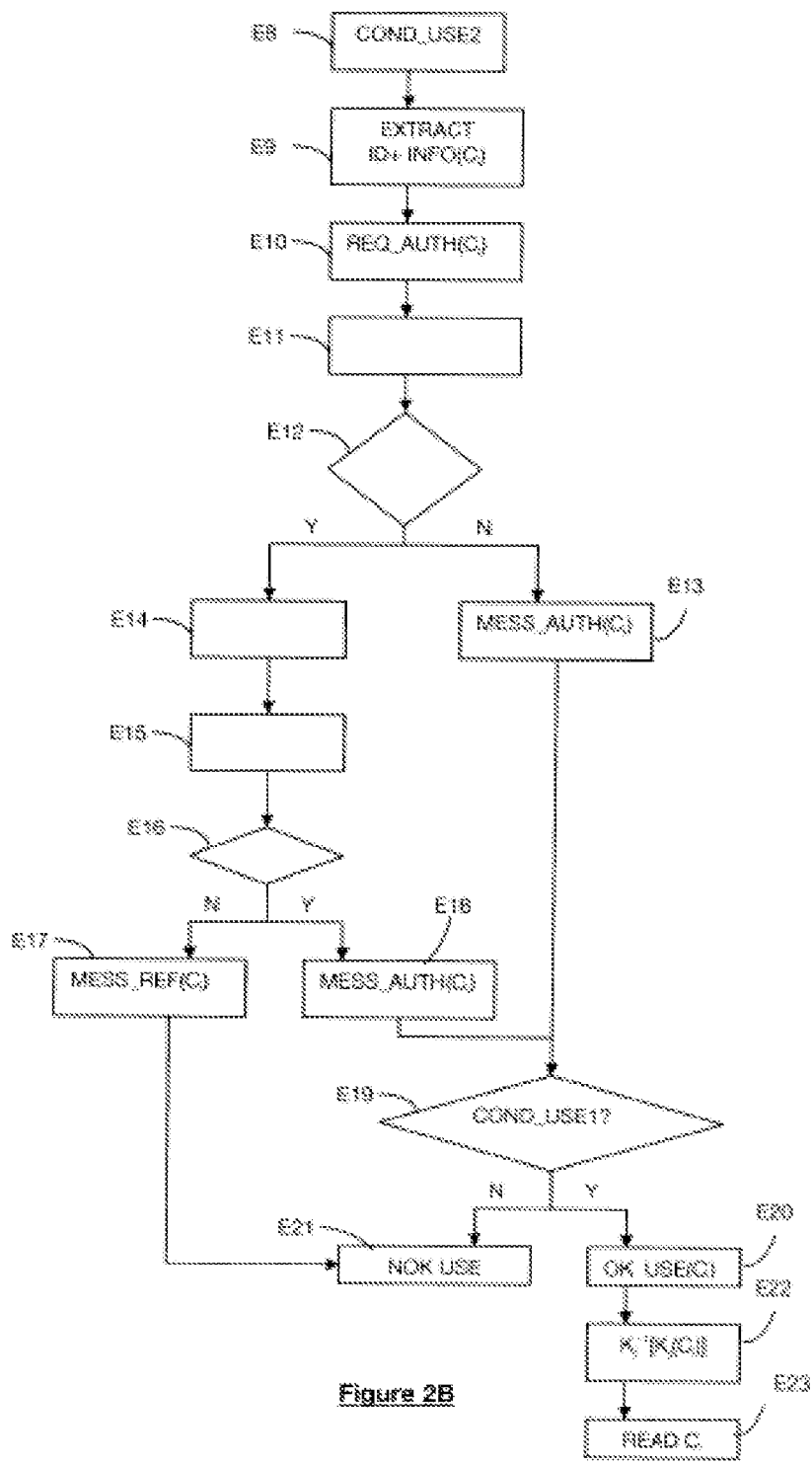

There now follows a description of the downloading and the reading of content $C_i$ by the user terminal 4, with reference to FIGS. 2A and 2B. In the particular example described here, the content $C_i$ is a video content, such as a film.

With reference to FIG. 2A, in a step E0, the terminal 4 transmits to the download server 1, through the Internet 100, a request $REQ_0(C_i)$ to download the content $C_i$ and an associated DRM license, denoted $L(C_i)$. The download request $REQ_0(C_i)$ here contains an identifier of a client parental control management module 41 of the terminal 1. In the case in point, since the module 41 is a software component, the identifier of this module 41 is the unique identifier of this software component. As a variant, the download server 1 could determine the unique identifier of the parental control module 41 of the terminal 4 in a preliminary configuration step, during which the terminal 4 would transmit the identifier of the module 41 to the server, and store this identifier in a database of client terminals in order to respond to the subsequent requests from the terminal 4 for downloading contents.

In a step E1, the download server 1 obtains, in response to a request $REQ_1(C_i)$ addressed to the parental control server 3, information on the nature of the content $C_i$, denoted $INFO(C_i)$. This information $INFO(C_i)$ here comprises levels characterizing the content in relation to the parental criteria of violence, nudity or sex.

In a step E2, the download server 1 obtains, in response to a request $REQ_2(C_i)$ addressed to the encryption device 2, the content $C_i$ encrypted form using a cryptographic encryption/decryption key, denoted $K_j(C_i)$ as well as the key $K_j$ used to encrypt the content $C_i$.

The steps E1 and E2 are here performed following receipt of the download request $REQ_0(C_i)$ by the download server 1. The order in which these two steps are performed is immaterial, the step E2 being able to be performed before the step E1. As a variant, the steps E1 and E2 could also be performed before receipt of the download request $REQ_0(C_i)$ from the user terminal.

In a step E3, the download server 1 generates a DRM license $L(C_i)$ for the content $C_i$. This license $L(C_i)$ is a data structure containing the following elements:
  an identifier $Id_i$ establishing the link between the license $L(C_i)$ and the content $C_i$,
  the key $K_k$ for decrypting the content $C_i$,
  conditions of use of the content $C_i$.

The conditions of use of the content $C_i$ two types of conditions
  conditions relating to the management of digital rights to use the content, denoted COND_USE1, such as a maximum number of uses of the content, a time window during which the content can be used, an authorized number of transfers of the content between different terminals, etc., and
  a condition, denoted COND_USE2, making the use of the content conditional upon the prior performance of a parental control operation.

This last condition COND_USE2 contains
  an indication according to which the use of the content $C_i$ is made conditional upon the prior performance of a parental control operation;
  information on the nature of the content $C_i$, corresponding to the information $INFO(C_i)$ supplied by the parental control server 3 for the content $C_i$,
  the unique identifier of the parental control management module 41 of the terminal 4.

This DRM license $L(C_i)$ can be stored upon a storage medium. In the case in point, it is intended to be transmitted to a recipient terminal and to be stored in a memory of this terminal.

In a step E4, in response to the download request $REQ_0$ ($C_i$), the download server 1 transmits to the terminal 4 the content $C_i$ in encrypted form using the key $K_j$, namely $K_j(C_i)$, and the DRM license $L(C_i)$ associated with this content $C_i$.

In a step E5, the terminal 4 receives and stores in a local memory 48 the content $C_i$ in encrypted form, $K_j(C_i)$, and the associated DRM license $L(C_i)$.

In a subsequent step E6, a user enters, using the user interface 44 of the terminal 5, a command to read the content $C_i$.

On receipt of the command to read the content $C_i$ has been entered, denoted $Cd\_READ(C_i)$, the reading module 43 addresses a request to use the content $C_i$, denoted $REQ\_USE$ ($C_i$), to the DRM client agent 40, in a step E7.

There now follows a description, with reference to FIG. 2B, of the method implemented by the DRM client agent 40 and by the parental control management module 41 to control the use of the protected content $C_i$ with the DRM license $L(C_i)$, following receipt of the request $REQ\_USE(C_i)$ to use the content $C_i$ the step E7.

On receipt of the request $REQ\_USE(C_i)$ to use the content $C_i$, the DRM agent 40 triggers the checking of the conditions of use of the content $C_i$, present in the license $L(C_i)$, in the case in point, the conditions COND_USE1 relating to the digital rights attached to the content $C_i$ and the condition COND_USE2 relating to the parental control.

In a step E8, it is first determined that the use of the content $C_i$ is conditional upon an obligation COND_USE2 to perform a parental control operation on the content $C_i$.

In a step E9, the DRM agent 40 extracts from the license $L(C_i)$ the unique identifier of the parental control module 41 and the information $INFO(C_i)$ on the nature of the content $C_i$.

Then, in a step E10, using the identifier extracted from the license $L(C_i)$, the DRM agent 40 transmits a request for authorization to use the content, denoted $REQ\_AUTH(C_i)$, to the parental control management module 41. The request $REQ\_AUTH(C_i)$ contains the information $INFO(C_i)$ on the nature of the content $C_i$ extracted from the license $L(C_i)$.

In a step E11, the parental control management module 41 informs the user of the fact that the requested content has certain levels relating to the predefined parental criteria (here, violence, nudity and sex), via the user interface 44.

Moreover, the parental control management module 41 determines whether the levels of the content $C_i$ relating to the parental criteria require a certain age on the part of the user, in a test step E12. In the example described here, such is the case if at least one of the levels is greater than or equal to two.

If the test E12 is negative (branch N following step E12), in other words if the content $C_i$ can be used without user age restriction, the parental control management module 41 transmits to the DRM agent 40, in response to the authorization request $REQ\_AUTH(C_i)$, a message authorizing the use of the content $C_i$, denoted $MESS\_AUTH(C_i)$, in a step E13.

If the test E12 is positive (branch Y following the step E12), in other words if the content $C_i$ can be used on condition that the user be of a certain age, the module 41 asks the user to prove that he or she is old enough for the content $C_i$ in a step E14.

In a step E15, the user enters information intended to prove his or her age using the user interface 44. This proof-of-age information may comprise, by way of illustrative examples, a confidential parental code, bank card details, identification data corresponding to a user account considered to be old enough, or any other information designed to prove a certain age on the part of the user.

As a variant, instead of asking the user to enter information intended to prove his or her age, the parental control management module 41 could use information relating to the user, intended to prove his or her age, kept in memory, for example in the form of "cookies". In this case, the steps E14 and E15 could not be applied.

In a test step E16, the parental control management module 41 checks that the proof-of-age information supplied by the user is exact. This check is done by comparing the information entered with user information prestored in a memory 49 of the terminal 4. The module 41 thus determines whether the user has provided proof of sufficient age to read the content $C_i$.

If the test step E16 is negative (branch N following step E16), in other words if the information supplied by the user cannot prove that the user is old enough to read the content $C_i$, the result of the parental control is negative. In this case, the parental control management module 41 notifies the DRM agent 40 of a denial of use of the content $C_i$. This denial can be communicated by the transmission from the parental control module 41 to the DRM agent 40 of a denial message, denoted $MESS\_REF(C_i)$, in response to the request $REQ\_AUTH(C_i)$ to authorize use of the content $C_i$, in a step E17. As a variant, the denial of use of the content $C_i$ could be notified by the parental control module 41 to the DRM agent 40 by an absence of response to the request $REQ\_AUTH(C_i)$ to authorize use of the content $C_i$ on expiry of a predefined waiting time delay, or time-out.

The step E17 is followed by a step E21, described below, of notification of a denial of use of the content $C_i$ the DRM agent 40 to the reading module 43. In this step E21, the DRM agent 40 informs the reading module 43 that it is denying the use by the latter of the content $C_i$.

If the test step E16 is positive (branch Y following the step E16), in other words if the information supplied by the user can prove that the user is old enough to read the content $C_i$, the result of the parental control is positive. In this case, the parental control management module 41 transmits to the DRM agent 40 a message authorizing use of the content $C_i$, $MESS\_AUTH(C_i)$, in response to the request $REQ\_AUTH$ ($C_i$) to authorize use of the content $C_i$, in a step E18.

Following each of the steps E13 and E18 of the sending of a message authorizing use of the content $C_i$, $MESS\_AUTH$ ($C_i$) by the parental control module 41 to the DRM agent 40, the DRM client agent 40 checks, in a known manner, the conditions of use COND_USE1 relating to the management of the digital rights attached to the content $C_i$, in a step E19.

If it is determined, in the step E19, following the step E13 or E18, that the conditions COND_USE1 are satisfied (branch Y following the step E19), the DRM agent 40 authorizes the reading module 43 to use the content $C_i$, in response to the use request $REQ\_USE(C_i)$. For this, the DRM agent 40 transmits to the reading module 43 a message agreeing use of the content $C_i$, denoted $OK\_USE(C_i)$, in a step E20. The message $OK\_USE(C_i)$ contains the key $K_j$ for decrypting the content $C_i$.

If it is determined in step E19 that the conditions COND_USE1 are not satisfied (branch N following the step E19), the step E19 is followed by the step E21 of notification of a denial of use of the content $C_i$ by the DRM agent 40 to the reading module 43. In this step E21, following the step E17 or E19, the DRM agent 40 informs the reading module 43 of its denial of use of the content $C_i$ by the reading module 43 here by abstaining from responding to the initial use request REQ_USE($C_i$) from the reading module 43. The absence of response to the request to use the content $C_i$ REQ_USE($C_i$) on the part of the DRM agent 40 on expiry of a predetermined waiting time delay, or time-out, is interpreted by the reading module 43 as notification of an implicit denial of use of the content $C_i$. As a variant, to notify the denial of use of the content $C_i$ to the reading module 43, the DRM agent 40 could transmit to reading module 43 an explicit message of denial of use of the content $C_i$, denoted NOK_USE($C_i$), in response to the use request REQ_USE($C_i$).

Following the step E20, on request from the reading module 43, the decryption module 42 decrypts the protected content $K_j(C_i)$ using the key $K_j$ contained in the license $L(C_i)$, in a step E22. Then, in a step E23, the reading module 43 reads the content $C_i$ requested by the user.

In the above description, the condition COND-USE2 is checked before the conditions COND_USE1. In a variant embodiment, the conditions COND_USE1 relating to the management of digital rights to use the content are checked before the condition COND_USE2 making the use of the content conditional upon the prior performance of a parental control operation. According to this variant, the steps E19-E21 are implemented before the steps E8-E18.

In another embodiment, the link between the DRM client agent 40 and the parental control management module 41 is secured. This securing is mainly to guarantee the origin and the integrity of the data exchanged between the two components 40 and 41. In particular, one aim of this securing is to enable the DRM client agent 40 to authenticate the data transmitted by the parental control management module 41. Different techniques can be envisaged to secure the link between the two components 40 and 41.

A first technique relies on a secret shared between the DRM agent 40 and the parental control management module 41. For example, the parental control management module 41 has a secret k and the license $L(C_i)$ of the content $C_i$ contains information designed to enable the DRM agent to retrieve this secret k. This information is either the secret k itself, or a diversification datum which makes it possible, from a germ known to the DRM agent 40, to retrieve the secret k. As a variant, the secret k can be stored in the DRM agent 40 and in the parental control management module 41 in a configuration phase. This secret k can be used in the exchanges between the DRM agent 40 and the parental control management module 41 either to encrypt the messages exchanged, or to perform the cryptographic control sums, more commonly called cryptographic checksums, from the messages exchanged.

A second technique relies on the use of a certificate associated with the parental control management module 41, containing a public key Kpub held by the module 41. A private key Kpr, associated with this public key, is stored by the parental control module 41. In this case, the license $L(C_i)$ for the content $C_i$ may contain the certificate of the parental control module 41. In the exchanges between the DRM agent 40 and the parental control module 41, the latter can use its private key Kpr to sign the messages transmitted to the DRM agent 40. The DRM agent 40 can then check the signature of the messages using the public key Kpub. Thus, the DRM agent 40 can authenticate the origin of the messages received from the parental control module 41.

Other techniques could be envisaged for protecting the link between the DRM agent 40 and the parental control application 41 and enabling at least the DRM agent 40 to authenticate the origin of the messages that it receives in its exchanges with the parental control module 41.

In the above description, the information INFO(C) on the nature of the content $C_i$ and the unique identifier of the parental control management module 41 are contained in the DRM license $L(C_i)$. As a variant, the information on the nature of the content $C_i$ could be contained in the content $C_i$ itself, for example in metadata present in the content $C_i$. Similarly, the identifier of the parental control management module 41 could be contained in the content itself.

Instead of being stored locally in the terminal, the user information intended to be used in the test step E16 to check that the proof-of-age information entered by the user is exact could be stored in a remote database located in a remote server. In this case, in the step E16, the parental control management module 41 would be designed to dialog with this remote server through the Internet and query this remote database in order to check that the information supplied by the user is exact.

In another variant embodiment, the DRM client agent could transmit the request for authorization REQ_AUTH ($C_i$) to use the content to a parental control management module hosted by a remote server, through a communication network.

In the above description, the information on the nature of the content INFO($C_i$) is supplied to the parental control module 41 by the DRM agent 40. As a variant, the parental control module 41 could recover this information on the nature of the content by querying a local database or a remote database (through the Internet 100).

It would be possible to envisage having the key $K_j$ for decrypting the content C not contained in the DRM license $L(C_i)$ associated with the content, but stored in the terminal 4 by another means.

The invention claimed is:

1. A method for obtaining and controlling use of content by a terminal, said terminal comprising a client agent for controlling the use of the content, wherein the method comprises:
   transmitting from the terminal to the server a parental control management module identifier,
   in response to a request transmitted to a server, receiving by the terminal said content in encrypted form together with an associated digital rights management license, said license containing conditions for the use of the content, including:
      a condition making the use of the content conditional upon prior performance of a parental control operation; and
      the identifier of said parental control management module transmitted,
   in case of a command to read said content, checking the conditions of use of the content present in the license by the controlling client agent, comprising:
      determining that the use of the content is conditional upon an obligation to perform the parental control operation on the content,
      extracting the identifier of the parental control management module from said received license, and
      using the identifier of the parental control management module extracted from the license, transmitting a request for authorization to use the content to the parental control management module,
   performing, by the parental control management module, the parental control operation on said content and transmitting a result of the parental control operation to the controlling agent in order to authorize or deny reading of the content depending on whether the result is positive or negative.

2. The method as claimed in claim 1, in which the parental control management module identifier is present in the request transmitted by the terminal to the server to obtain the content.

3. The method as claimed in claim 1, in which the parental control management module identifier is transmitted by the terminal to the server in a preliminary configuration step and is stored by the server in a database in order to respond to subsequent requests from the terminal to receive contents.

4. The method as claimed in claim 1, further comprising determining information relating to a nature of the content, in which the client agent extracts said information from the license associated with the content.

5. The method as claimed in claim 1, further comprising determining information relating to a nature of the content, in which the client agent extracts said information from the content.

6. The method as claimed in claim 1, in which the client agent transmits the request for authorization to use the content to a parental control management module located in the user terminal.

7. The method as claimed in claim 6, in which, in the parental control operation, the parental control management module dialogs with a remote server, through a communication network.

8. The method as claimed in claim 1, in which the client agent transmits the request for authorization to use the content to a parental control management module hosted by a remote server, through a communication network.

9. The method as claimed in claim 1, further comprising authenticating the parental control management module by the client agent controlling the use of the content.

10. A communication terminal comprising:
    a communications module configured to communicate with a server and arranged to transmit to the server a parental control management module identifier, to transmit to the server a request to obtain content and to receive, in response, the content in encrypted form together with an associated digital rights management license containing conditions for the use of the content, which include:
        a condition making the use of the content conditional upon prior performance of a parental control operation; and
        the identifier of said parental control management module transmitted by the terminal to the server;
    a reading module configured to read the content; and
    an agent configured to control the use of the content, arranged, in case of a command to read said content by the reading module, to check the conditions of use of the content present in the license the agent being arranged to:
        determine that the use of the content is conditional upon an obligation to perform the parental control operation on the content,
        extract the identifier of the parental control management module from said received license, and
        transmit a request for authorization to use the content to the parental control management module, identified by the identifier of the parental control management module extracted from the license, and
        authorize or deny reading of the content by the reading module depending on whether the result of the parental control operation is positive or negative; and
    a central control unit configured to control the communications module, the reading module and the agent.

11. The terminal as claimed in claim 10, further comprising said parental control management module.

12. A method comprising:
    receiving, by a terminal, a request a request to use content protected with a digital rights management license, wherein the licenses contains conditions for use of the content, which include:
        a condition making the use of the content conditional upon prior performance of a parental control operation; and
        an identifier of a parental control management module; and
    checking, by a client agent of the terminal, the conditions of use of the content by making a determination that the use of the content is conditional upon an obligation to perform the parental control operation on the content, extracting the identifier of the parental control management module from said received license, transmitting a request for authorization to use the content from the controlling client agent to the parental control management module, receiving from the parental control management module a result of the parental control operation, and authorizing use of the content if the result is positive or denying use of the content if the result is negative.

* * * * *